(12) United States Patent
Tanaka

(10) Patent No.: US 7,092,770 B2
(45) Date of Patent: *Aug. 15, 2006

(54) FEEDBACK CONTROL METHOD AND FEEDBACK CONTROL DEVICE

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/508,821

(22) PCT Filed: Apr. 4, 2003

(86) PCT No.: PCT/JP03/04347

§ 371 (c)(1),
(2), (4) Date: Mar. 29, 2005

(87) PCT Pub. No.: WO03/085462

PCT Pub. Date: Oct. 16, 2003

(65) Prior Publication Data
US 2005/0165498 A1 Jul. 28, 2005

(30) Foreign Application Priority Data
Apr. 5, 2002 (JP) .............................. 2002-104057

(51) Int. Cl.
G05B 13/02 (2006.01)
G05B 11/01 (2006.01)
G05B 13/00 (2006.01)

(52) U.S. Cl. ............................ 700/45; 700/37; 700/42; 700/54; 700/71; 318/561

(58) Field of Classification Search .................. 700/28, 700/29, 32, 37–47, 52, 54, 55, 71–74; 318/561, 318/611; 324/76.79, 76.81; 72/35.05; 702/188, 702/189
See application file for complete search history.

(56) References Cited

U.S. PATENT DOCUMENTS

| | | | | |
|---|---|---|---|---|
| 4,084,410 A | * | 4/1978 | Michon | 464/82 |
| 4,530,270 A | * | 7/1985 | Denaci | 89/1.11 |
| 5,414,741 A | * | 5/1995 | Johnson | 375/376 |
| 6,388,416 B1 | * | 5/2002 | Nakatani et al. | 318/700 |
| 6,892,101 B1 | * | 5/2005 | Tanaka | 700/46 |

FOREIGN PATENT DOCUMENTS

| | | |
|---|---|---|
| EP | 1094375 A | 4/2001 |
| JP | 61-131102 A | 11/1984 |
| JP | 11-224104 A | 8/1999 |
| JP | 2000-181549 A | 6/2000 |

* cited by examiner

Primary Examiner—Crystal J. Barnes

(74) Attorney, Agent, or Firm—Blakely Sokoloff Taylor & Zafman

(57) ABSTRACT

The response process of disturbance recovery control is divided into a follow-up phase, a convergence phase, and a stable phase. A feedback control device includes a first phase switching unit (3) which switches to the follow-up phase, a second phase switching unit (4) which switches to the convergence phase, a third phase switching unit (5) which switches to the stable phase, a first manipulated variable determining unit (6) which outputs a manipulated variable which makes the controlled variable follow up the set point in the follow-up phase, a second manipulated variable determining unit (7) which outputs a manipulated variable which makes the controlled variable converge near the set point in the convergence phase, and a third manipulated variable determining unit (8) which outputs a manipulated variable which makes the controlled variable stable at the set point in the stable phase.

14 Claims, 11 Drawing Sheets

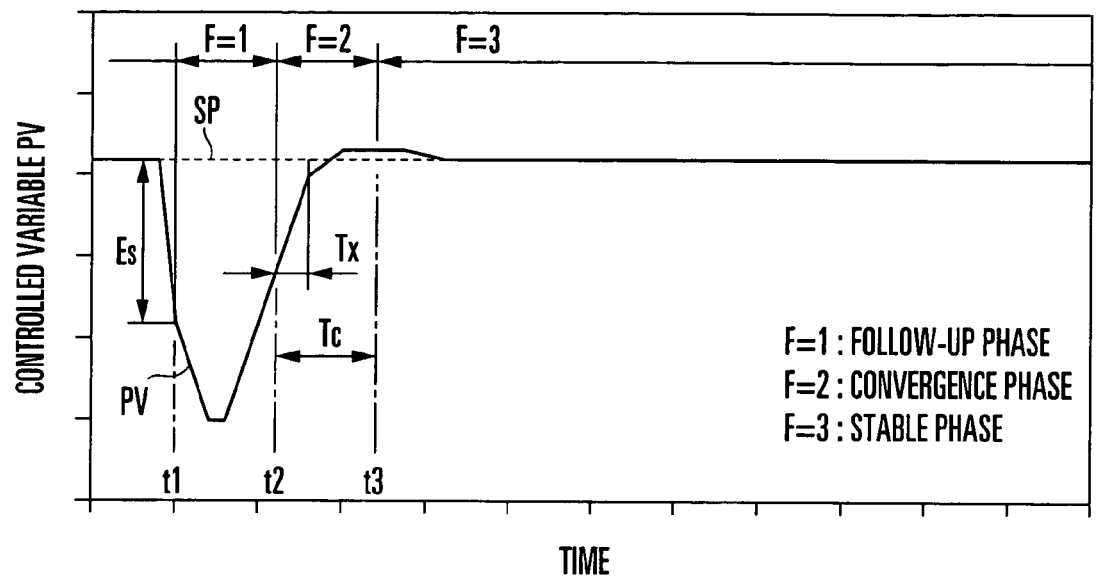
F I G. 12A
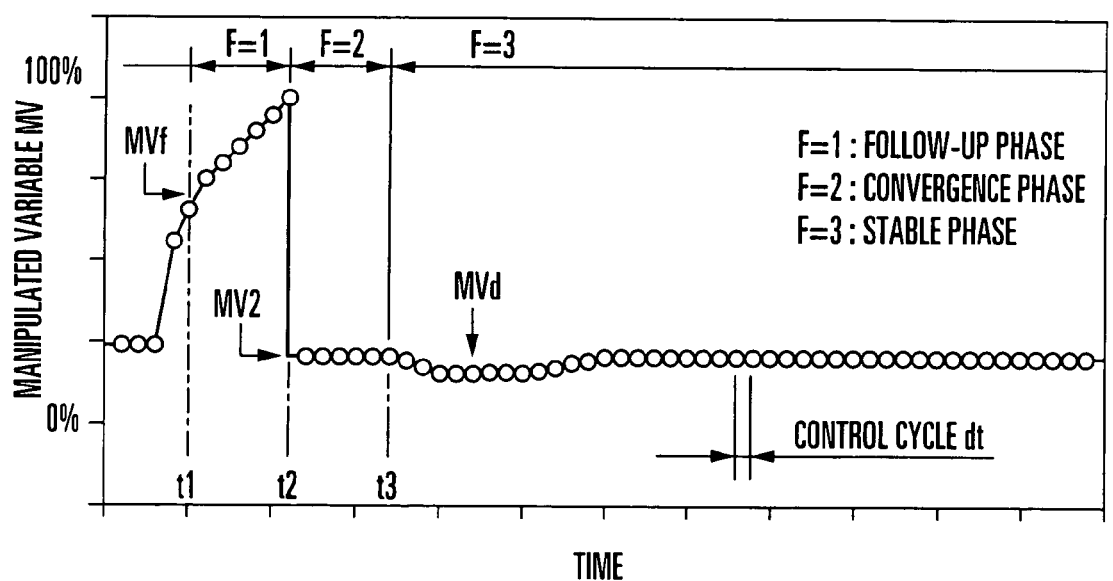
F I G. 12B

FEEDBACK CONTROL METHOD AND FEEDBACK CONTROL DEVICE

The present patent application is a non-provisional application of International Application No. PCT/JP03/04347, filed Apr. 4, 2003.

BACKGROUND OF THE INVENTION

The present invention relates to a process control technique and, more particularly, to a feedback control method and feedback control device which perform disturbance recovery control by giving a manipulated variable to a controlled system so as to make the controlled variable recover to the set point at the time of application of a disturbance.

Conventionally, PID control has been known as a highly practical general control theory. As an advanced control theory like modern control theory, for example, simple adaptive control (SAC) has been known. According to either of the control theories, a manipulated variable MV is output as a control computation result to a controlled system so as to make a controlled variable PV recover to a set point SP at the time of application of a disturbance, and control computation is performed on the basis of a deviation Er between the controlled variable PV and the set point SP.

General PID control is a linear control theory, and is a control theory based on the assumption that a control system including a controlled system becomes a linear system. In practice, however, a controlled system does not have linearity in a strict sense, and PID control can tolerate slight nonlinearity. For example, heating by a halogen lamp in a RTP (Rapid Thermal Process) used in a semiconductor manufacturing apparatus is a system with strong nonlinearity to which PID control cannot be simply applied. In this case, even PID control can be used if only the stability of a control system is to be pursued. However, PID control cannot cope with operation under the condition that a fast temperature rise and a response waveform with a little overshoot are required as in an RTP.

Assume that the nonlinearity of a control system can be approximated by a characteristic curve K shown in FIG. 14. In this case, when the controlled variable PV is to be made to recover to the set point SP with a fast temperature rise (fast disturbance recovery) at the time of application of a temperature-decreasing disturbance, the manipulated variable MV (heating output) becomes 100% at the time point when the deviation Er between the set point SP and the controlled variable PV is large. As a consequence, an average process gain characteristic curve has a large gradient as indicated by "Kav1" in FIG. 14. As the temperature rises and the deviation Er decreases, the manipulated variable MV decreases to, for example, about 20%. In this case, an average process gain characteristic curve becomes another characteristic curve having a small gradient as indicated by "Kav2" in FIG. 14.

When the PID parameters of a PID controller are adjusted in conformity with specifications for fast disturbance recovery, and the PID controller is applied to a strong nonlinearity system like that shown in FIG. 14, a temperature rise curve (disturbance recovery waveform) becomes like a curve PV in FIG. 15. That is, in the first half period of response, overshoot occurs in the controlled variable PV as in a case wherein a controlled system with an excessively large process gain is controlled, whereas in the second half period of response, control operation occurs such that the controlled variable PV follows up to the set point SP at extremely low speed as in a case wherein a controlled system with an excessively small process gain is controlled. As a result, a temperature rise curve like that shown in FIG. 15 appears. This control is not suitable for a controlled system for which a response waveform with a little overshoot is required as in the case of a semiconductor manufacturing apparatus. In addition, adjustment of PID parameters falls out of the range of a linear control theory, and hence is very difficult to realize.

An advanced adaptive control theory such as simple adaptive control (SAC) is designed to automatically correct the internal parameters of a control computation unit so as to always obtain proper control characteristics with respect to variations in the process gain characteristic of a controlled system. However, for proper automatic correction (adaptive operation) for the internal parameters, control computation must be performed by a sufficient number of times in a transient state. In fast disturbance recovery, the time required for a temperature rise is about 1.0 to 1.5 sec, as shown in FIG. 16A. If, therefore, the control cycle is 50 msec, the number of times of control computation in disturbance recovery is about 20 to 30.

The number of times of control computation allowed to follow up a change in process gain due to strong nonlinearity characteristics under such conditions is about two to three at best, as shown in FIG. 16B. This number of times of control computation is simply too small to make adaptive operation properly function. At practical level, a technique based on an advanced adaptive control theory can obtain the stability of control, in the end, at best, but cannot make a controlled system with strong nonlinearity characteristics smoothly achieve fast disturbance recovery. This technique is substantially directed to only ensure stability in application to not only fast disturbance recovery but also other operations. Furthermore, there are no guidelines for practical standards concerning settings of many parameters to be set in advance for proper adaptive operation.

As described above, according to the conventional PID control theory, proper disturbance recovery control cannot be realized for a controlled system with strong nonlinearity, and it is difficult to adjust PID parameters.

In addition, according to an advanced adaptive control theory such as simple adaptive control (SAC), in a controlled system with strong nonlinearity characteristics, when the controlled variable is to be made to recover to the set point at high speed, since the number of times of control computation allowed is too small to make adaptive operation properly function, proper disturbance recovery control cannot be realized. In addition, it is difficult to adjust parameters.

SUMMARY OF THE INVENTION

The present invention has been made to solve the above problems, and has its object to provide a feedback control method and feedback control device which can realize proper disturbance recovery control and can easily adjust parameters for the execution of proper disturbance recovery control even if a system with strong nonlinearity is set as a controlled system.

According to the present invention, there is provided a feedback control method of performing disturbance recovery control by giving a manipulated variable to a controlled system so as to make a controlled variable recover to a set point at the time of application of a disturbance, comprising the step of dividing a response process of disturbance recovery control into three stages including a follow-up phase, a convergence phase, and a stable phase, the first phase switching step of switching to the follow-up phase at a disturbance application detection time point as a start time point of the follow-up phase, the follow-up phase manipulated variable determination step of continuously outputting a manipulated variable which makes the controlled variable follow up the set point in the follow-up phase, the second phase switching step of switching to the convergence phase at a disturbance recovery control elapsed time point, as a start time point of the convergence phase, at which the controlled variable does not exceed the set point in the follow-up phase, the convergence phase manipulated variable determination step of continuously outputting a manipulated variable which makes the controlled variable converge near the set point in the convergence phase, the third phase switching step of switching to the stable phase at a time point, as a start time point of the stable phase, at which a preset state is reached in the convergence phase, and the stable phase manipulated variable determination step of continuously outputting a manipulated variable which makes the controlled variable stable at the set point in the stable phase.

In an example of the arrangement of the feedback control method according to the present invention, the first phase switching step comprises the step of setting a time point, as the start time point of the follow-up phase, at which it is confirmed on the basis of a deviation between a set point and a controlled variable that a disturbance has been applied.

In an example of the arrangement of the feedback control method according to the present invention, the first phase switching step comprises the step of setting a time point, as the start time point of the follow-up phase, at which a phase switching signal is input from an external unit which notifies application of a disturbance.

In an example of the arrangement of the feedback control method according to the present invention, the second phase switching step comprises the step of calculating a predicted value of a remaining time for attainment which is a time taken for a current controlled variable to reach the set point in the follow-up phase, on the basis of a deviation between the set point and the controlled variable and a controlled variable change ratio, and the step of setting a time point, as the start time point of the convergence phase, at which the calculated predicted value of the remaining time for attainment becomes smaller than a preset time index.

In an example of the arrangement of the feedback control method according to the present invention, the third phase switching step comprises the step of setting a time point, as the start time point of the stable phase, at which a preset time index has elapsed.

In an example of the arrangement of the feedback control method according to the present invention, the follow-up phase manipulated variable determination step comprises the step of continuously outputting a preset manipulated variable.

In an example of the arrangement of the feedback control method according to the present invention, the convergence phase manipulated variable determination step comprises the step of continuously outputting a preset manipulated variable.

In addition, according to the present invention, there is provided a feedback control device for dividing a response process of disturbance recovery control into three stages including a follow-up phase, a convergence phase, and a stable phase and performing disturbance recovery control by giving a manipulated variable to a controlled system so as to make a controlled variable recover to a set point at the time of application of a disturbance, comprising a first phase switching unit which switches to the follow-up phase at a disturbance application detection time point as a start time point of the follow-up phase, a second phase switching unit which switches to the convergence phase at a disturbance recovery control elapsed time point, as a start time point of the convergence phase, at which the controlled variable does not exceed the set point in the follow-up phase, a third phase switching unit which switches to the stable phase at a time point, as a start time point of the stable phase, at which a preset state is reached in the convergence phase, a first manipulated variable determining unit which continuously outputs a manipulated variable which makes the controlled variable follow up the set point in the follow-up phase, a second manipulated variable determining unit which continuously outputs a manipulated variable which makes the controlled variable converge near the set point in the convergence phase, and a third manipulated variable determining unit continuously outputs a manipulated variable which makes the controlled variable stable at the set point in the stable phase.

In an example of the arrangement of the feedback control device according to the present invention, the first phase switching unit sets a time point, as the start time point of the follow-up phase, at which it is confirmed on the basis of a deviation between a set point and a controlled variable that a disturbance has been applied.

In an example of the arrangement of the feedback control device according to the present invention, the first phase switching unit sets a time point, as the start time point of the follow-up phase, at which a phase switching signal is input from an external unit which notifies application of a disturbance.

In an example of the arrangement of the feedback control device according to the present invention, the second phase switching unit calculates a predicted value of a remaining time for attainment which is a time taken for a current controlled variable to reach the set point in the follow-up phase, on the basis of a deviation between the set point and the controlled variable and a controlled variable change ratio, and sets a time point, as the start time point of the convergence phase, at which the calculated predicted value of the remaining time for attainment becomes smaller than a preset time index.

In an example of the arrangement of the feedback control device according to the present invention, the third phase switching unit sets a time point, as the start time point of the stable phase, at which a preset time index has elapsed.

In an example of the arrangement of the feedback control device according to the present invention, the manipulated variable determining unit continuously outputs a preset manipulated variable.

In an example of the arrangement of the feedback control device according to the present invention, the second manipulated variable determining unit continuously outputs a preset manipulated variable.

BRIEF DESCRIPTION OF DRAWINGS

FIGS. 12A and 12B are timing charts showing the operation of a feedback control device according to the second embodiment of the present invention;

DETAILED DESCRIPTION OF EMBODIMENTS

[First Embodiment]

The first embodiment of the present invention will be described in detail below with reference to the accompanying drawings. In this embodiment, the response process of disturbance recovery control accompanying the application of a disturbance is divided into three stages of phases (a follow-up phase, a convergence phase, and a stable phase). A proper, simple manipulated variable output sequence is assigned to each phase, and a series of phases are combined to forcibly and directly shape the response waveform of disturbance recovery control.

Figure 1A:
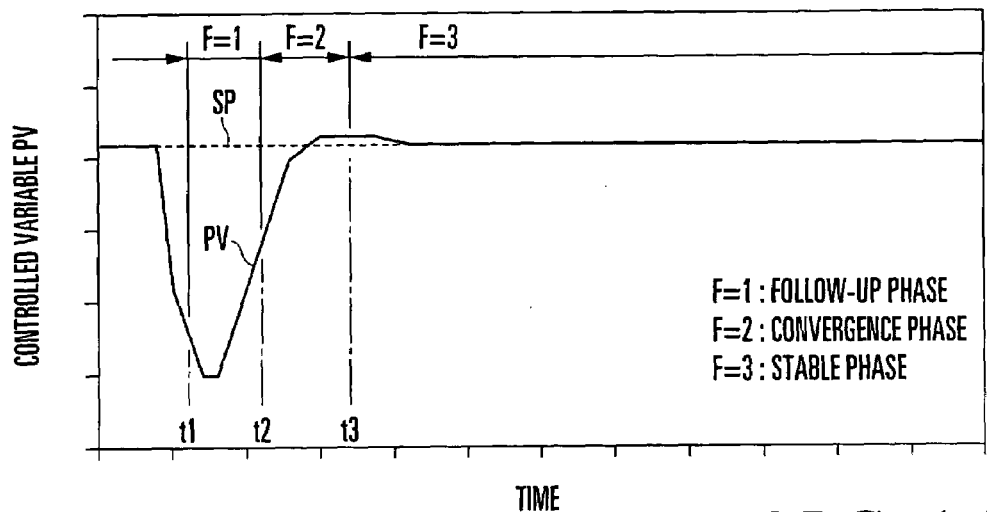
FIGS. 1A and 1B are waveform charts for explaining a follow-up phase, a convergence phase, and a stable phase in the present invention.
Figure 1B:
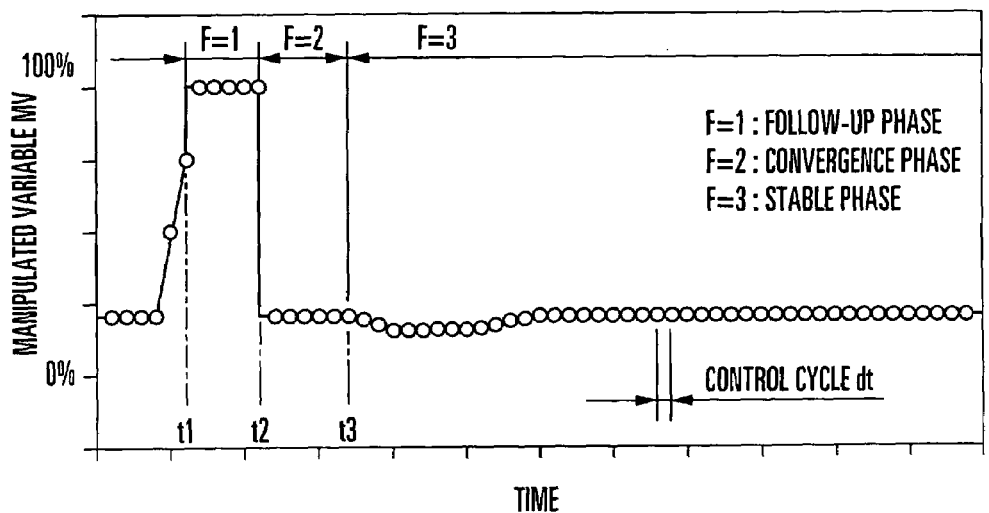

FIGS. 1A and 1B are waveform charts for explaining a follow-up phase, convergence phase, and stable phase in this embodiment. FIG. 1A is a chart showing changes in controlled variable PV (response waveform). FIG. 1B is a chart showing changes in manipulated variable MV. The symbol "○" in FIG. 1B indicates the manipulated variable MV output in each control cycle dt.

First of all, in a response process, the interval from a time point t1 at which the application of a disturbance is detected to a specific disturbance recovery control elapsed time point t2 at which the controlled variable PV does not exceed a set point SP is defined as a follow-up phase. In the follow-up phase, the response waveform of disturbance recovery control is not disturbed, and the manipulated variable MV which makes the controlled variable PV follow up the set point SP is continuously output.

The interval from the specific disturbance recovery control elapsed time point t2 to a time point t3 at which a pre-designated state is reached is defined as a convergence phase. In the convergence phase, the response waveform of disturbance recovery control is not disturbed, and the manipulated variable MV which makes the controlled variable PV converge near the set point SP is continuously output. The time after the time point t3 at which the pre-designated state is reached is defined as a stable phase. In the stable phase, the manipulated variable MV which makes the controlled variable PV stable at the set point SP is continuously output.

Figure 2:
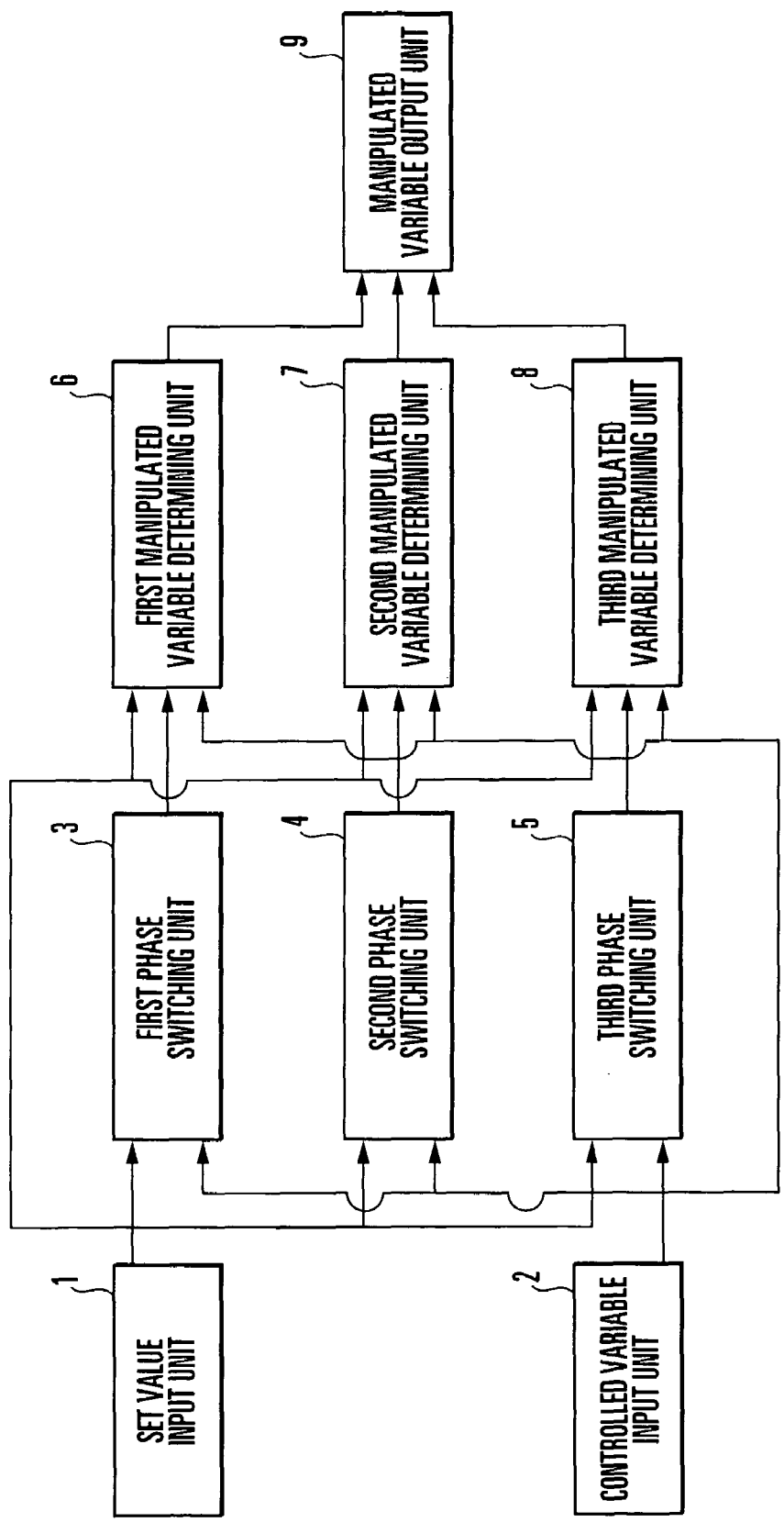
FIG. 2 is a block diagram showing the arrangement of a feedback control device according to the first embodiment of the present invention.

FIG. 2 is a block diagram showing the arrangement of a feedback control device according to this embodiment. The feedback control device according to this embodiment includes a set value input unit 1 which inputs the set point SP set by the operator of the control device, a controlled variable input unit 2 which inputs the controlled variable PV detected by a sensor (not shown), a first phase switching unit 3 which switches to a follow-up phase at a disturbance application detection time point as the start time point t1 of the follow-up phase, a second phase switching unit 4 which switches to a convergence phase at a specific disturbance recovery control elapsed time point, at which the controlled variable PV does not exceed the set point SP in the follow-up phase, as the start time point t2 of the convergence phase, a third phase switching unit 5 which switches to a stable phase at a time point at which a preset state is reached in the convergence phase as the start time point t3 of the stable phase, a first manipulated variable determining unit 6 which continuously outputs the manipulated variable MV which makes the controlled variable PV follow up the set point SP in the follow-up phase, a second manipulated variable determining unit 7 which continuously outputs the manipulated variable MV which makes the controlled variable PV converge near the set point SP in the convergence phase, a third manipulated variable determining unit 8 which continuously outputs the manipulated variable MV which makes the controlled variable PV stable at the set point SP in the stable phase, and a manipulated variable output unit 9 which outputs to a controlled system (not shown) the manipulated variable MV determined in accordance with each phase.

Figure 3:
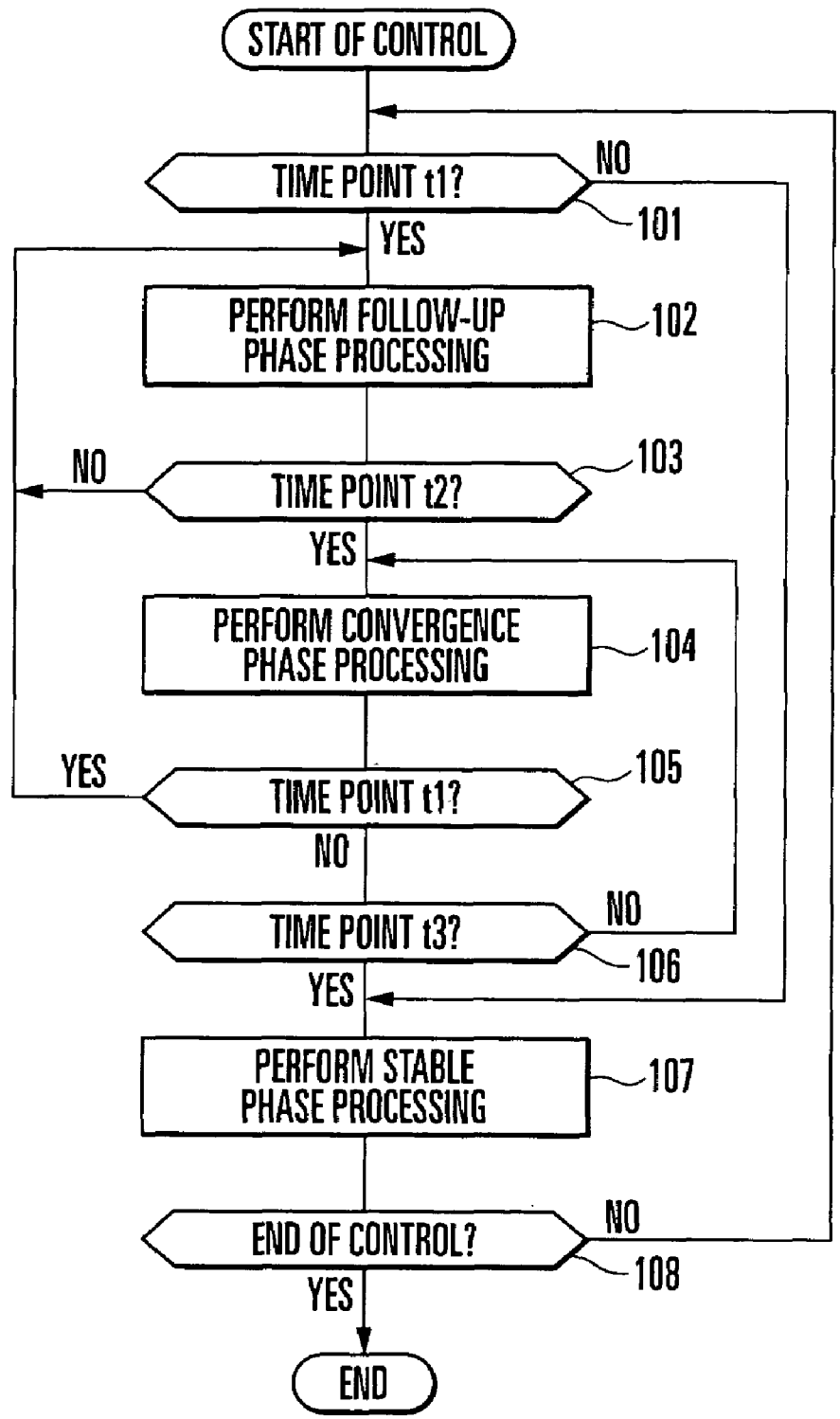
FIG. 3 is a flowchart showing the operation of the feedback control device in FIG. 2.

FIG. 3 is a flowchart showing the operation of the feedback control device in FIG. 2. The set point SP is set by the operator of the control device and is input to the first phase switching unit 3, second phase switching unit 4, third phase switching unit 5, first manipulated variable determining unit 6, second manipulated variable determining unit 7, and third manipulated variable determining unit 8 through the set value input unit 1.

The controlled variable PV for the controlled system is detected by the sensor (not shown) and is input to the first phase switching unit 3, second phase switching unit 4, third phase switching unit 5, first manipulated variable determining unit 6, second manipulated variable determining unit 7, and third manipulated variable determining unit 8 through the controlled variable input unit 2.

In the initial state, a stable phase is selected. That is, at the start of control, the first phase switching unit 3 determines whether or not the current time point is the start time point t1 of a follow-up phase (step 101 in FIG. 3). If it is determined that the current time point is not the start time point t1, the flow advances to step 107 to maintain the stable phase without performing phase switching. In the stable phase, the third manipulated variable determining unit 8 outputs the manipulated variable MV specified in advance, and the manipulated variable output unit 9 outputs the manipulated variable, output from the third manipulated variable determining unit 8, to the controlled system (step 107).

If it is determined in step 101 that the current time point is the start time point t1 of a follow-up phase, the first phase switching unit 3 switches from the stable phase to the follow-up phase, and notifies the second phase switching unit 4, third phase switching unit 5, and first manipulated variable determining unit 6 of the switching to the follow-up phase. In the follow-up phase, the first manipulated variable determining unit 6 outputs the manipulated variable MV specified in advance, and the manipulated variable output unit 9 outputs the manipulated variable, output from the first manipulated variable determining unit 6, to the controlled system (step 102).

When the stable phase is switched to the follow-up phase, the second phase switching unit 4 determines whether or not the current time point is the start time point t2 of a convergence phase (step 103). If it is determined that the current time point is not the start time point t2, the flow returns to step 102 to maintain the follow-up phase without performing phase switching.

If it is determined in step 103 that the current time point is the start time point t2 of a convergence phase, the second phase switching unit 4 switches from the follow-up phase to the convergence phase, and notifies the first phase switching unit 3, third phase switching unit 5, and second manipulated variable determining unit 7 of the switching to the convergence phase. In the convergence phase, the second manipulated variable determining unit 7 outputs the manipulated variable MV specified in advance, and the manipulated variable output unit 9 outputs the manipulated variable, output from the second manipulated variable determining unit 7, to the controlled system (step 104).

When the follow-up phase is switched to the convergence phase, the first phase switching unit 3 determines whether or not the current time point is the start time point t1 of the follow-up phase (step 105). If it is determined that the current time point is the start time point t1 of the follow-up phase, the flow advances to step 102 to switch from the convergence phase to the follow-up phase, and notifies the second phase switching unit 4, third phase switching unit 5, and first manipulated variable determining unit 6 of the switching to the follow-up phase. If the first phase switching unit 3 determines that the current time point is not the start time point t1, the flow advances to step 106 to maintain the convergence phase without performing phase switching.

The third phase switching unit 5 determines whether or not the current time point is the start time point t3 of a stable phase (step 106). If it is determined that the current time point is not the start time point t3, the flow returns to step 104 to maintain the convergence phase without performing phase switching.

If it is determined in step 106 that the current time point is the start time point t3 of the stable phase, the third phase switching unit 5 switches from the convergence phase to the stable phase, and notifies the first phase switching unit 3, second phase switching unit 4, and third manipulated variable determining unit 8 of the switching to the stable phase. The processing in step 107 is the same as that described above. The above processing in steps 101 to 107 is repeated for each control cycle dt until the control device is stopped by a command from an operator or the like (YES in step 108).

Figure 4:
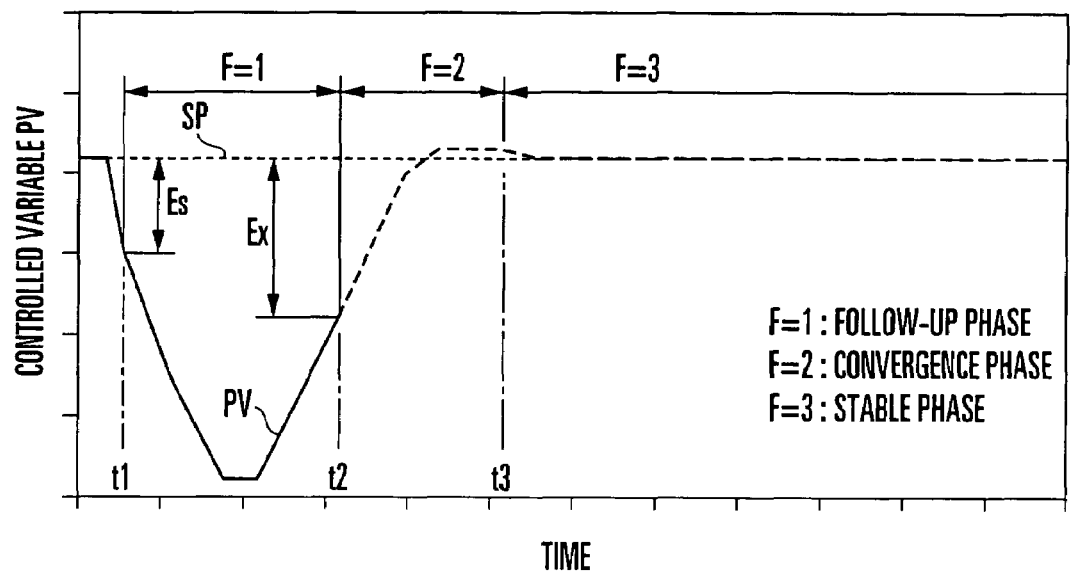
FIG. 4 is a waveform chart for explaining switching from the stable phase to the follow-up phase and switching from the follow-up phase to the convergence phase.
Figure 5:
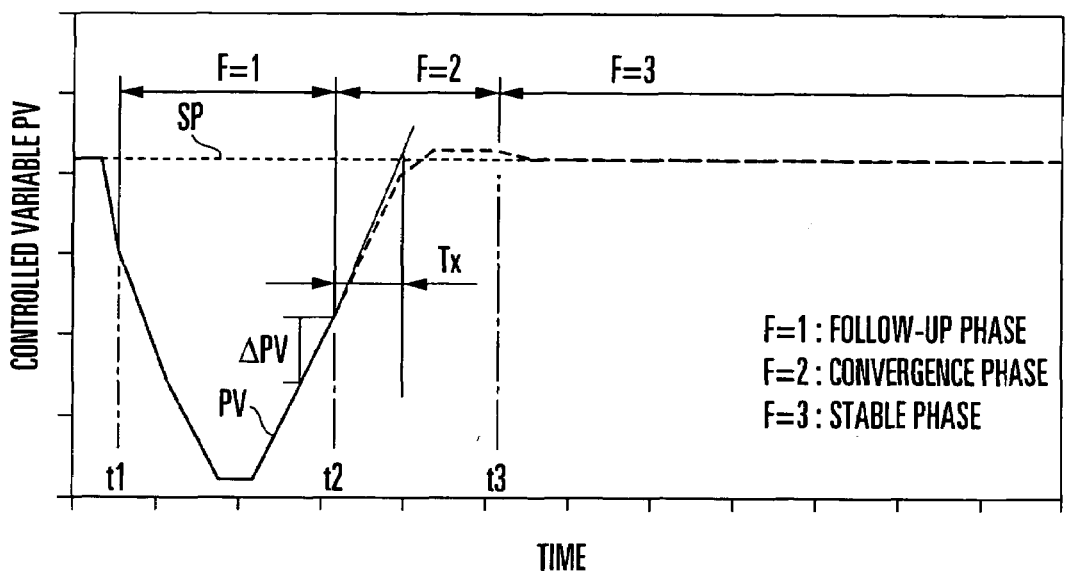
FIG. 5 is a waveform chart for explaining switching from the stable phase to the follow-up phase and switching from the follow-up phase to the convergence phase.

Phase switching will be described in more detail below. FIGS. 4 and 5 are waveform charts for explaining switching from a stable phase to a follow-up phase and switching from a follow-up phase to a convergence phase. There are two methods of determining whether to switch from a stable phase to a follow-up phase. According to one determination method, the first phase switching unit 3 determines, as the follow-up phase start time point (disturbance application detection time point) t1, a time point at which a deviation Er between the set point SP and the controlled variable PV exceeds a preset deviation index Es in a state wherein the controlled variable PV is stable near the set point SP (in the state of a stable phase), and switches from the stable phase to the follow-up phase (FIG. 4).

According to the other determination method, the first phase switching unit 3 determines, as the start time point t1 of a follow-up phase, a time point at which a phase switching signal is input from an external device which notifies the application of a disturbance, and switches from the stable phase to the follow-up phase.

There are also two methods of determining whether to switch from a follow-up phase to a convergence phase. According to one determination method, the second phase switching unit 4 determines, as the convergence phase start time point (specific disturbance recovery control elapsed time point) t2, a time point at which the deviation Er between the set point SP and the controlled variable PV becomes smaller than a preset deviation index Ex, and switches from the follow-up phase to the convergence phase (FIG. 4).

According to the other determination method, the second phase switching unit 4 calculates a predicted value Tr of the remaining time until the controlled variable PV reaches the set point SP in the current control cycle according to $Tr=Er/\Delta PV$ on the basis of the deviation Er between the set point SP and the controlled variable PV and a change ratio $\Delta PV$ of the controlled variable PV. The second phase switching unit 4 then determines, as the convergence phase start time point (specific disturbance recovery control elapsed time point) t2, a time point at which the calculated predicted value Tr of the remaining time for attainment becomes smaller than a preset time index Tx, and switches from the follow-up phase to the convergence phase (FIG. 5).

Figure 6:
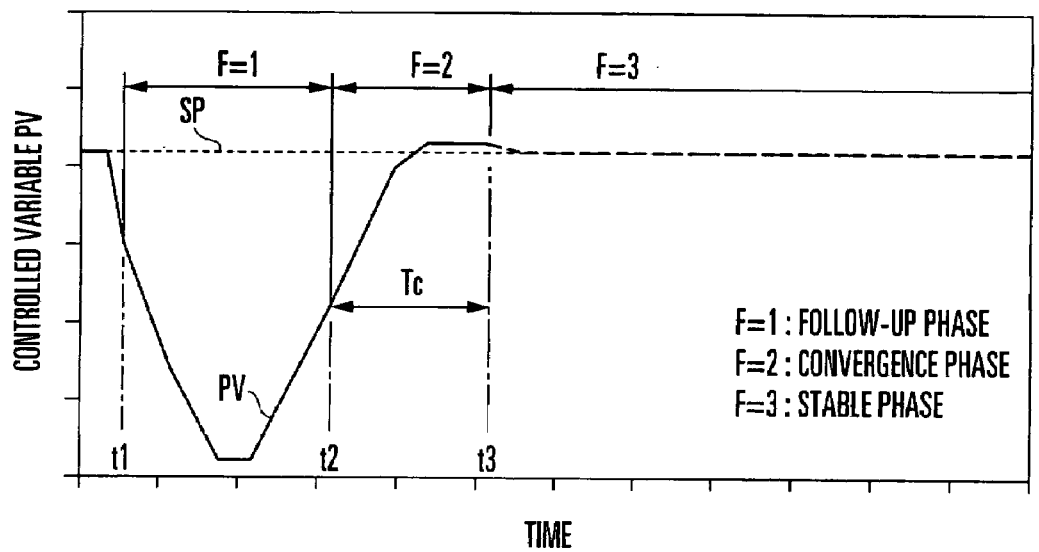
FIG. 6 is a waveform chart for explaining switching from the convergence phase to the stable phase.

FIG. 6 is a waveform chart for explaining switching from a convergence phase to a stable phase. The third phase switching unit 5 determines, as a stable phase start time point (a time point at which a pre-designates state is reached) t3, a time point at which a preset time index Tc has elapsed since the start time point t2 of the convergence phase, and switches from the convergence phase to the stable phase.

A manipulated variable determination step in each phase will be described next. There are three kinds of manipulated variable determination steps in a follow-up phase. According to the first sequence, the first manipulated variable determining unit 6 continuously outputs a preset manipulated variable MV1.

Figure 7:
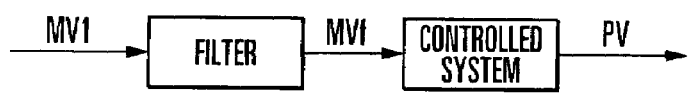
FIG. 7 is a view for explaining a manipulated variable determination step in the follow-up phase.

According to the second sequence, the first manipulated variable determining unit 6 performs time delay filter processing of the preset manipulated variable MV1, and continuously outputs a resultant value MVf. That is, in the second sequence, the manipulated variable MV1 is processed through a time delay filter like that shown in FIG. 7, and the resultant manipulated variable MVf is given to the controlled system.

Figure 8:
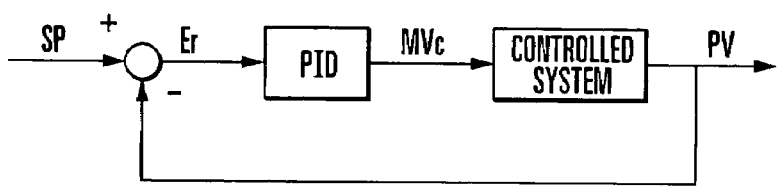
FIG. 8 is a view for explaining a manipulated variable determination step in the follow-up phase.

According to third sequence, the first manipulated variable determining unit 6 continuously outputs a manipulated variable MVc calculated by a PID control algorithm (including P, PD, and PI control) that attaches importance to quick control response. That is, in the third sequence, the manipulated variable MVc is calculated by a PID control system like that shown in FIG. 8 from the deviation Er, and is given to the controlled system.

In a convergence phase, the second manipulated variable determining unit 7 continuously outputs a preset manipulated variable MV2. In a stable phase, the third manipulated variable determining unit 8 continuously outputs a manipulated variable MVd calculated by a PID control algorithm (including P, PD, and PI control) that attaches importance to the stability of control. That is, the third manipulated variable determining unit 8 calculates the manipulated variable MVd from the deviation Er by using a PID control system like that shown in FIG. 8, and gives it to the controlled system.

In this embodiment, as described above, it is an important aspect that the response process of disturbance recovery control is divided into three stages of phases (a follow-up phase, a convergence phase, and a stable phase). When, for example, disturbance recovery control is to be performed for a controlled system with strong nonlinearity so as to make the controlled variable PV recover to the set point SP at the time of the application of a disturbance, the average process gain characteristic of the controlled system in a stage corresponding to a follow-up phase greatly differs from that in a stage corresponding to a stable phase.

In this case, if the follow-up phase and stable phase are to be controlled by a control technique based on the same characteristics, control characteristics suitable for the follow-up phase are unsuitable for the stable phase, and vice versa. For example, in fast disturbance recovery in temperature control, since characteristics abruptly switch between a follow-up phase and a stable phase, the control response waveform is disturbed before and after the switching time point. That is, not only control characteristics deteriorate in either a follow-up phase or a stable phase, but also a noticeable disturbance of the control response waveform appears in an intermediate stage between the two phases.

This embodiment is configured to perform control by the technique of giving different control characteristics to a follow-up phase and stable phase. In addition, a convergence phase is provided to perform control by giving different control characteristics so as to prevent the control response waveform from being disturbed before and after the switching time point between a follow-up phase and a stable phase.

In a follow-up phase, first of all, the manipulated variable MV aimed at only making the controlled variable PV follow up the set point SP is output. In the convergence phase, the manipulated variable MV aimed at only making the controlled variable PV converge near the set point SP is output to shift from the follow-up phase to the stable phase. Finally, in the stable phase, the manipulated variable MV aimed at only stabilizing the controlled variable PV at the set point SP is output.

In this embodiment, since the control characteristics for a follow-up phase, convergence phase, and stable phase can be independently adjusted, parameters can be easily adjusted in accordance with an actual target. In disturbance recovery control, in particular, the response waveform of disturbance recovery control can be forcibly and directly shaped by adjusting the switching time point between a follow-up phase and a convergence phase and adjusting the manipulated variable MV in the convergence phase. This makes it possible to realize smooth disturbance recovery control.

Figure 9A:
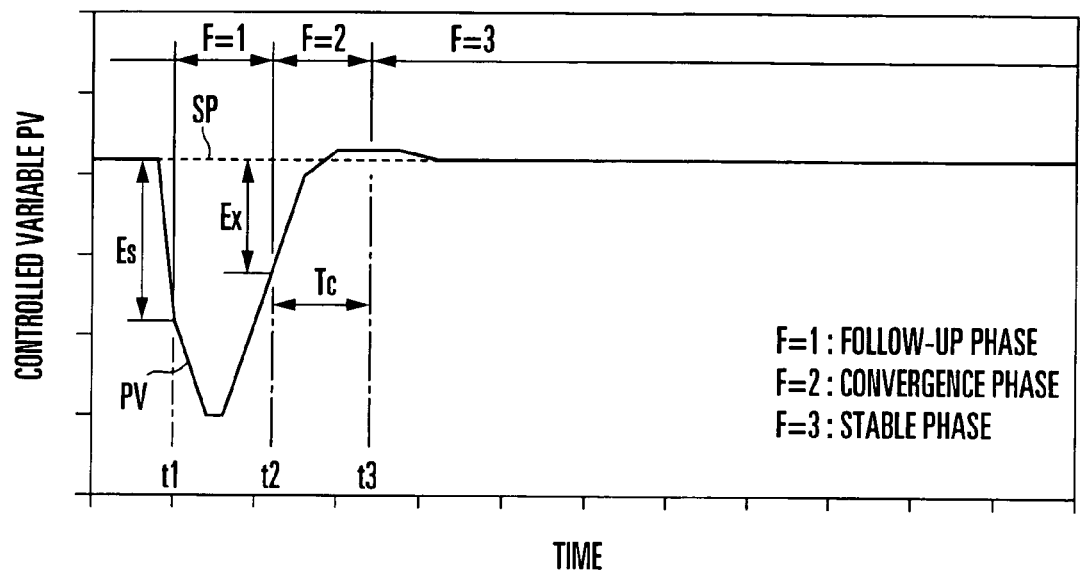
FIGS. 9A and 9B are waveform charts showing the operation of the feedback control device according to the first embodiment of the present invention.
Figure 9B:
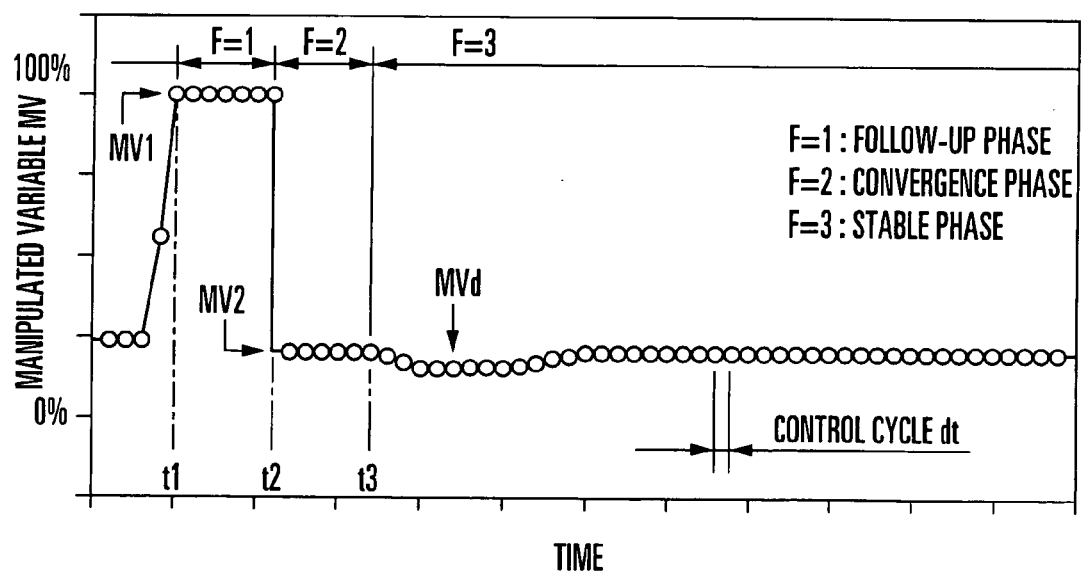

More specific operation of this embodiment will be described next by exemplifying a case wherein the feedback control device shown in FIG. 2 is applied to fast disturbance recovery control. FIGS. 9A and 9B are waveform charts showing the operation of the feedback control device according to this embodiment. FIG. 9A is a chart showing changes in controlled variable PV. FIG. 9B is a chart showing changes in manipulated variable MV. As described above, the processing in steps 101 to 108 in FIG. 3 is performed in each control cycle dt. The symbol "○" in FIG. 9B indicates the manipulated variable MV output in each control cycle dt.

In this embodiment, a switching time point (disturbance application detection time point) t1 from a stable phase to a follow-up phase is a time point at which the deviation Er between the set point SP and the controlled variable PV exceeds the preset deviation index Es in a state wherein the controlled variable PV is stable near the set point SP (the state of the stable phase). A switching time point (specific disturbance recovery control elapsed time point) t2 from a follow-up phase to a convergence phase is a time point at which the deviation Er between the set point SP and the controlled variable PV becomes smaller than the preset deviation index Ex. A switching time point (a time point at which a pre-designated state is reached) t3 from a convergence phase to a stable phase is a time point at which the preset time index Tc has elapsed.

In this embodiment, the step of determining the manipulated variable MV in a follow-up phase is the step of continuously outputting the preset manipulated variable MV1. The step of determining the manipulated variable MV in a convergence phase is the step of continuously outputting the preset manipulated variable MV2. The step of determining the manipulated variable MV in a stable phase is the step of continuously outputting the manipulated variable MVd calculated by a PID control algorithm that attaches importance to the stability of control.

In this embodiment, a parameter which indicates a phase is represented by F; F=1, F=2, and F=3 indicate a follow-up phase, convergence phase, and stable phase, respectively. Assume that a set point in a current control cycle n is represented by Sp(n); a controlled variable in the control cycle n, PV(n); a manipulated variable in the control cycle n, MV(n); and a control deviation in the control cycle n, Er(n).

Assume that in step 101 or 105 in FIG. 3, the deviation Er(n) in the current control cycle n is larger than the preset deviation index Es, and a deviation Er(n−1) in an immediately preceding control cycle is smaller than the deviation index Es. In this case, the first phase switching unit 3 sets the parameter F indicating a phase to F=1 (follow-up phase), and outputs F=1 to the second phase switching unit 4, third phase switching unit 5, and first manipulated variable determining unit 6. That is, the first phase switching unit 3 performs the following processing.

$$\text{if } Er(n) > Es \text{ and } Er(n-1) < Es \text{ then } F \leftarrow 1 \qquad (1)$$

Note that when receiving a notification of F=2 or F=3 from the second phase switching unit 4 or third phase switching unit 5, the first phase switching unit 3 changes the value of the parameter F output to the first manipulated variable determining unit 6 to the notified value, i.e., F=2 or F=3.

The manipulated variable MV1 in a follow-up phase is set in advance in the first manipulated variable determining unit 6. The first manipulated variable determining unit 6 outputs the preset manipulated variable MV1 as the manipulated variable MV(n) when the value of the parameter F output from the first phase switching unit 3 is F=1 (step 102 in FIG.

3; FIG. 9B). That is, the first manipulated variable determining unit 6 performs the following processing.

$$\text{if } F=1 \text{ then } MV(n) \leftarrow MV1 \qquad (2)$$

It suffices if the manipulated variable MV1 is set to make the controlled variable PV recover to the set point SP with a desired follow-up characteristic. When the preset invention is applied to fast disturbance recovery control, MV1=100% is appropriate.

The second phase switching unit 4 then calculates the deviation Er(n) between the set point SP(n) and the controlled variable PV(n) in the current control cycle n.

$$Er(n)=SP(n)-PV(n) \qquad (3)$$

In addition, the deviation index Ex for determination on phase switching is set in advance in the second phase switching unit 4. Assume that in step 103 in FIG. 3, the value of the parameter F is set to F=1, the set point SP(n) has not changed from the set point SP(n−1), and the deviation Er(n) is smaller than the deviation index Ex. In this case, the second phase switching unit 4 determines that the current time point is the start time point t2 of a follow-up phase, sets the value of the parameter F to F=2 (convergence phase), and outputs F=2 to the first phase switching unit 3, third phase switching unit 5, and second manipulated variable determining unit 7. That is, the second phase switching unit 4 performs the following processing.

$$\text{if } F=1 \text{ and } SP(n)=SP(n-1) \text{ and } Er(n)<Ex \text{ then } F \leftarrow 2 \qquad (4)$$

Figure 10:
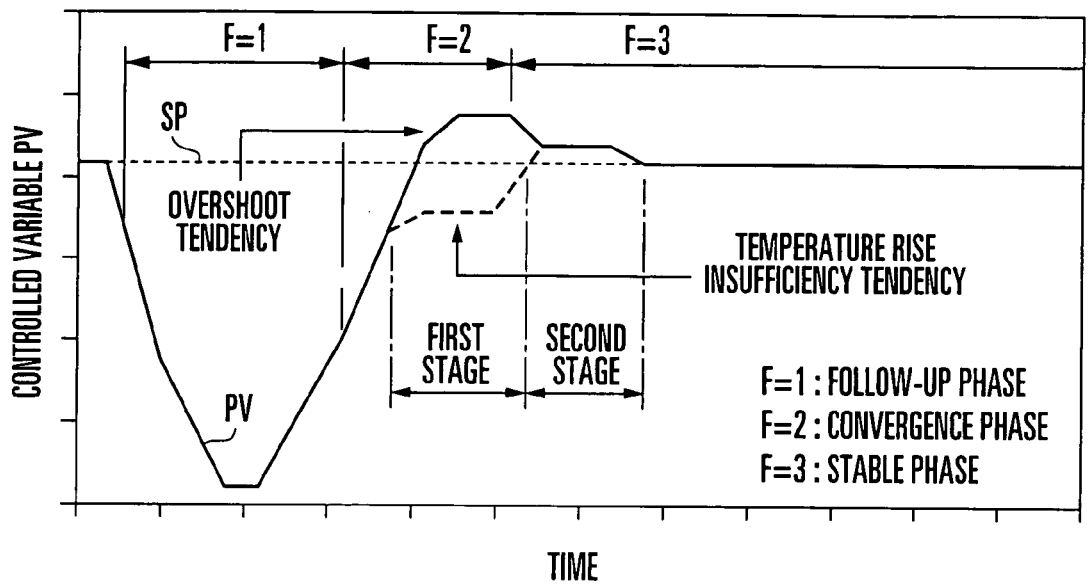
FIG. 10 is a waveform chart for explaining a method of adjusting a deviation index in the first embodiment of the present invention.

The deviation index Ex may be adjusted by trial and error to shift from a follow-up phase to a convergence phase at a proper timing, i.e., make the controlled variable PV recover to the set point SP with a desired follow-up characteristic (response waveform). When the present invention is applied to fast disturbance recovery control, an overshoot tendency or temperature rise insufficiency tendency appears in two stages, as shown in FIG. 10. The deviation index Ex may be adjusted in consideration of the first stage such that when overshoot occurs, the deviation index Ex is set to a large value, whereas when temperature rise insufficiency occurs, the deviation index Ex is set to a small value. Since the deviation index Ex is a numerical value having an effect of forcibly and directly shaping the response waveform of disturbance recovery control, a proper value of the deviation index Ex can be easily obtained by trial and error.

Upon receiving a notification of F=1 or F=3 from the first phase switching unit 3 or third phase switching unit 5, the second phase switching unit 4 changes the value of the parameter F output to the second manipulated variable determining unit 7 to the notified value, i.e., F=1 or F=3.

The manipulated variable MV2 in a convergence phase is set in advance in the second manipulated variable determining unit 7. If the value of the parameter F output from the second phase switching unit 4 is F=2, the second manipulated variable determining unit 7 outputs the preset manipulated variable MV2 as the manipulated variable MV(n) (step 104 in FIG. 3; FIG. 9B). That is, the second manipulated variable determining unit 7 performs the following processing.

$$\text{if } F=2 \text{ then } MV(n) \leftarrow MV2 \qquad (5)$$

Figure 11:
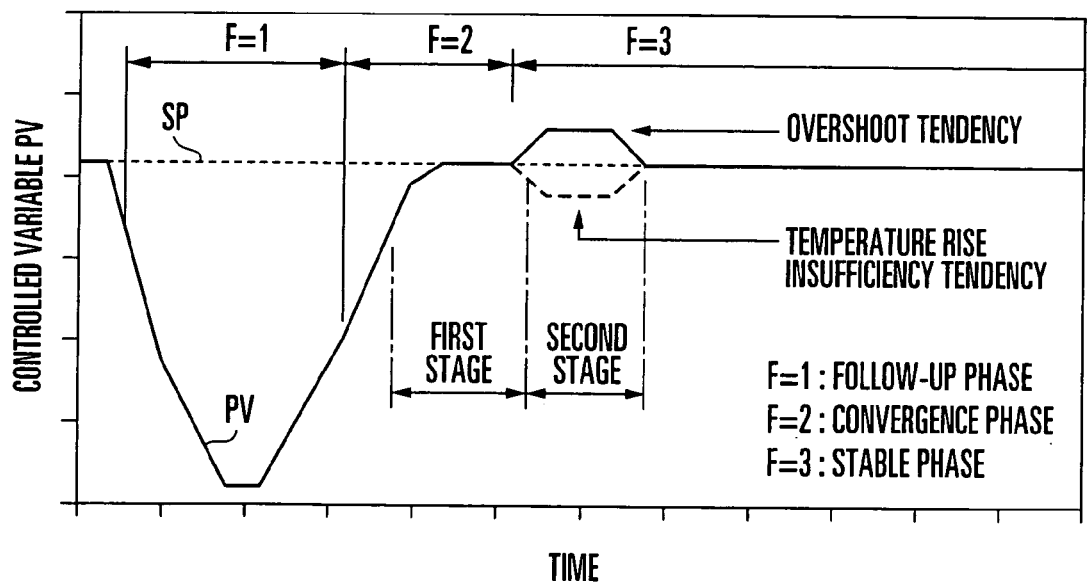
FIG. 11 is a waveform chart for explaining a method of adjusting a manipulated variable output value from a second manipulated variable determining unit in the first embodiment of the present invention.

The manipulated variable MV2 may be adjusted by trial and error so as to make the controlled variable PV converge to the set point SP with a desired characteristic. When the present invention is applied to fast disturbance recovery control, an overshoot tendency or temperature rise insufficiency tendency appears in two stages, as shown in FIG. 11.

The manipulated variable MV2 may be adjusted in consideration of the second stage such that when overshoot occurs, the manipulated variable MV2 is set to a small value, whereas when temperature rise insufficiency occurs, the manipulated variable MV2 is set to a large value. Since the manipulated variable MV2 is a numerical value having an effect of forcibly and directly shaping the response waveform of disturbance recovery control, a proper value of the manipulated variable MV2 can be easily obtained by trial and error.

The time index Tc for determination on phase switching is set in advance in the third phase switching unit 5. Assume that in step 106 in FIG. 3, the value of the parameter F is F=2, and an elapsed time tn from the time point t2 set in F=2 (convergence phase) is longer than the time index Tc. In this case, the third phase switching unit 5 determines that the current time point is the start time point t3 of a stable phase, sets the value of the parameter F to F=3 (stable phase), and outputs F=3 to the first phase switching unit 3, second phase switching unit 4, and third manipulated variable determining unit 8. That is, the third phase switching unit 5 performs the following processing.

$$\text{if } F=2 \text{ and } tn>Tc \text{ then } F \leftarrow 3 \qquad (6)$$

The time index Tc may be adjusted by trial and error so as to make the controlled variable PV converge to the set point SP with a desired characteristic. When the present invention is applied to fast disturbance recovery control, it is appropriate to set this index to a time about one to two times a process wasteful time Lp for the controlled system. Note that upon receiving a notification of F=1 or F=2 from the first phase switching unit 3 or second phase switching unit 4, the third phase switching unit 5 changes the value of the parameter F output to the third manipulated variable determining unit 8 to the notified value, i.e., F=1 or F=2.

If the value of the parameter F output from the third phase switching unit 5 is F=3, the third manipulated variable determining unit 8 outputs as the manipulated variable MV(n) a manipulated variable MVd(n) calculated by a PID control algorithm that attaches importance to the stability of control (step 107 in FIG. 3; FIG. 9B). That is, the third manipulated variable determining unit 8 performs the following processing.

$$\text{if } F=3 \text{ then } MV(n) \leftarrow MVd(n) \qquad (7)$$

In this case, the PID control algorithm that attaches importance to the stability of control is expressed by a transfer function using Laplace operators as follows:

$$MVd(n)=Kg3\{1+(1/Ti3s)+Td3s\}\{SP(n)-PV(n)\} \qquad (8)$$

In equation (8), Kg3 is a proportional gain, Ti3 is an integral time, and Td3 is a derivative time. Note that the manner of setting the parameters Kg3, Ti3, and Td3 for the attachment of importance to stability is known, and hence a description thereof will be omitted.

As described above, according to this embodiment, the response process of disturbance recovery control is divided into three stages, namely a follow-up phase, convergence phase, and stable phase, and the respective phases are switched such that a disturbance application detection time point is regarded as the start time point of a follow-up phase, a specific disturbance recovery control elapsed time point at which the controlled variable does not exceed the set point in the follow-up phase is regarded as the start time point of a convergence phase, and a time point at which a preset state is reached in the convergence phase is regarded as the start time point of a stable phase. In the follow-up phase, a manipulated variable which makes the controlled variable follow up the set point is output. In the convergence phase, a manipulated variable which makes the controlled variable converge near the set point is output. In the stable phase, a manipulated variable which makes the controlled variable stable at the set point is output. Since the control characteristics for a follow-up phase, convergence phase, and stable phase can be adjusted independently, parameters can be easily adjusted in accordance with an actual target. The response waveform of disturbance recovery control can be forcibly and directly shaped by adjusting the switching time point from a follow-up phase to a convergence phase and adjusting the manipulated variable in the convergence phase, in particular. Even if, therefore, a system with strong nonlinearity is a controlled system, appropriate disturbance recovery control can be realized. In addition, in this embodiment, even if the number of times of control computation is insufficient according to an advanced adaptive control theory such as simple adaptive control (SAC), appropriate control can be realized even in the case of, for example, fast disturbance recovery control.

[Second Embodiment]

The second embodiment of the present invention will be described next. This embodiment shows another example in which the present invention is applied to fast disturbance recovery control. In this embodiment, the arrangement of a feedback control device and the flow of processing are the same as those shown in FIGS. 2 and 3, and hence will be described by using reference numerals in FIGS. 2 and 3. FIGS. 12A and 12B are waveform charts showing the operation of the feedback control device according to this embodiment. FIG. 12A is a chart showing changes in controlled variable PV. FIG. 12B is a chart showing changes in manipulated variable MV. The symbol "○" in FIG. 12B indicates the manipulated variable MV output in each control cycle dt.

In this embodiment, assume that a switching time point (disturbance application detection time point) t1 from a stable phase to a follow-up phase is a time point at which a deviation Er between a set point SP and a controlled variable PV becomes larger than a preset deviation index Es in a state wherein the controlled variable PV is stable near the set point SP (the state of a stable phase).

Assume also that a switching time point (specific disturbance recovery control elapsed time point) t2 from a follow-up phase to a convergence phase is a time point at which a predicted value Tr=Er/ΔPV of the remaining time for attainment calculated on the basis of the deviation Er between the set point SP and the controlled variable PV and a change ratio ΔPV of the controlled variable PV becomes smaller than a preset time index Tx. Assume further that a switching time point (a time point at which a pre-designated state is reached) t3 from a convergence phase to a stable phase is a time point at which a preset time index Tc has elapsed.

In this embodiment, the step of determining the manipulated variable MV in a follow-up phase is the step of processing a preset manipulated variable MV1 through a time delay filter and continuously outputting a resultant value MVf. The step of determining the manipulated variable MV in a convergence phase is the step of continuously outputting a preset manipulated variable MV2. The step of determining the manipulated variable MV in a stable phase is the step of continuously outputting a manipulated variable MVd calculated by a PID control algorithm that attaches importance to the stability of control.

The operation of a first phase switching unit 3 is the same as that in the first embodiment. The manipulated variable MV1 and a primary delay filter time constant Tf in a follow-up phase are set in advance in a first manipulated variable determining unit 6. If the value of a parameter F output from the first phase switching unit 3 is F=1, the first manipulated variable determining unit 6 processes the preset value MV1 through a primary delay filter, and outputs a resultant value MVf(n) as manipulated variable MV(n) (step 102 in FIG. 3; FIG. 12B). That is, the first manipulated variable determining unit 6 performs the following processing.

$$\text{if } F=1 \text{ then } MV(n) \leftarrow MVf(n) \quad (9)$$

In this case, an arithmetic expression of primary delay filter processing is expressed by a transfer function using Laplace operators as follows:

$$MVf(n) = \{1/(1+Tfs)\}MV1 \quad (10)$$

The first manipulated variable determining unit 6 calculates the value MVf after primary delay filter processing according to expression (9).

The manipulated variable MV1 may be set to make the controlled variable PV follow up the set point SP with a desired follow-up characteristic. When the present invention is applied to fast disturbance recovery control, MV1=100% is appropriate. The primary delay filter time constant Tf may be arbitrarily set such that the disturbance recovery speed at which the controlled variable PV recovers to the set point SP after the application of a disturbance is set to a desired speed. When the present invention is applied to fast disturbance recovery control, an adjustment can be made to decrease the temperature rise rate by increasing the primary delay filter time constant Tf.

A second phase switching unit 4 then calculates a deviation Er(n) between a set point SP(n) and a controlled variable PV(n) in a current control cycle n according to equation (3). The second phase switching unit 4 also calculates a predicted value Tr(n) of the remaining time until the controlled variable PV reaches the set point SP in the current control cycle as follows:

$$Tr(n) = Er(n)/\Delta PV \quad (11)$$
$$= Er(n)dt/\{Pv(n) - PV(n-1)\}$$

In equation (11), dt is a control cycle, and PV(n−1) is a controlled variable in an immediately preceding control cycle.

The time index Tx for determination on phase switching is set in advance in the second phase switching unit 4. Assume that in step 103 in FIG. 3, the value of the parameter F is F=1, the set point SP(n) has not changed from a set point SP(n−1), and a predicted value Tr(n) of the remaining time for attainment is smaller than the time index Tx. In this case, the second phase switching unit 4 sets the value of the parameter F to F=2 (convergence phase), and outputs F=2 to the first phase switching unit 3, a third phase switching unit 5, and a second manipulated variable determining unit 7. That is, the second phase switching unit 4 performs the following processing.

$$\text{if } F=1 \text{ and } SP(n)=SP(n-1) \text{ and } Tr(n)<Tx \text{ then } F \leftarrow 2 \quad (12)$$

The time index Tx may be adjusted by trail and error to shift from a follow-up phase to a convergence phase at a proper timing, i.e., make the controlled variable PV recover to the set point SP with a desired follow-up characteristic. When the present invention is applied to fast disturbance recovery control, an overshoot tendency or temperature rise insufficiency tendency appears in two stages, as shown in FIG. 10. The time index Tx may be adjusted in consideration of the first stage such that when overshoot occurs, the time index Tx is corrected into a large value, whereas when temperature rise insufficiency occurs, the time index Tx is corrected into a small value. Since the time index Tx is a numerical value having an effect of forcibly and directly shaping the response waveform of disturbance recovery control, a proper value of the time index Tx can be easily obtained by trial and error.

The operations of second manipulated variable determining unit 7, third phase switching unit 5, and third manipulated variable determining unit 8 are the same as those in the first embodiment.

[Third Embodiment]

Figure 13A:
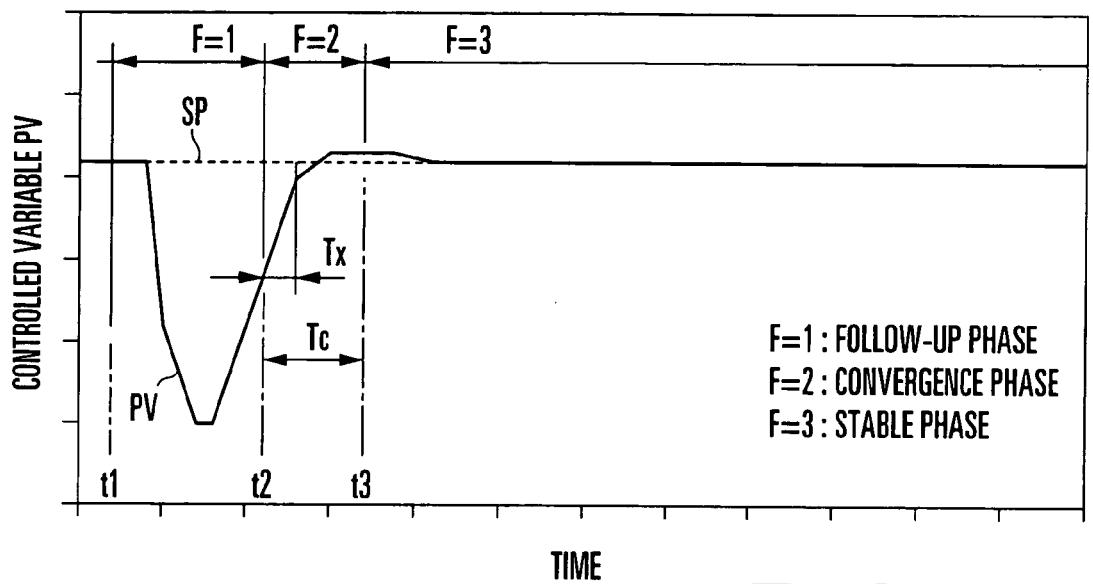
FIGS. 13A and 13B are timing charts showing the operation of a feedback control device according to the third embodiment of the present invention.
Figure 13B:
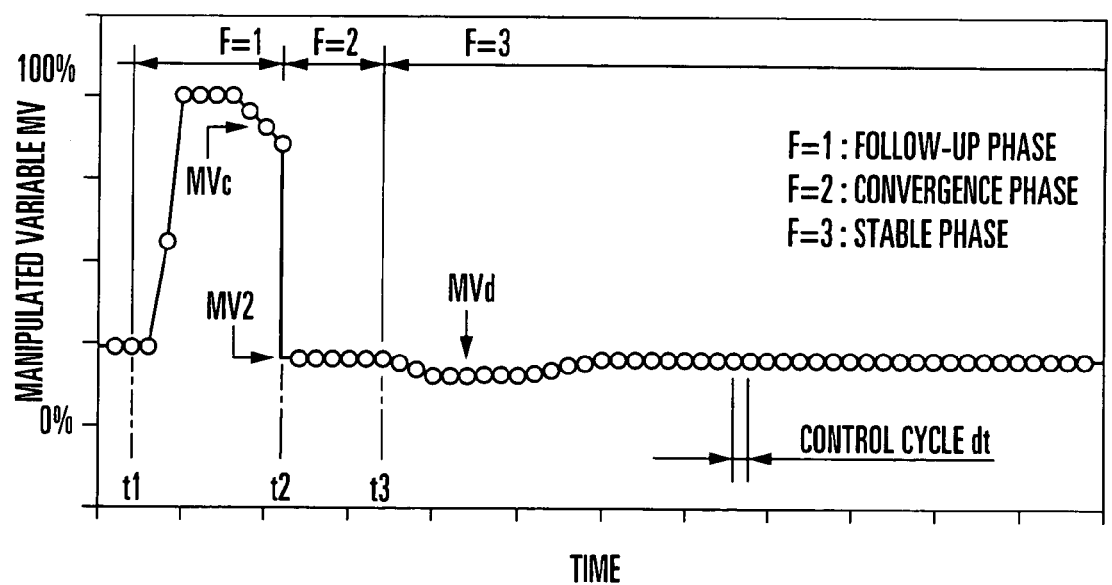
Figure 14:
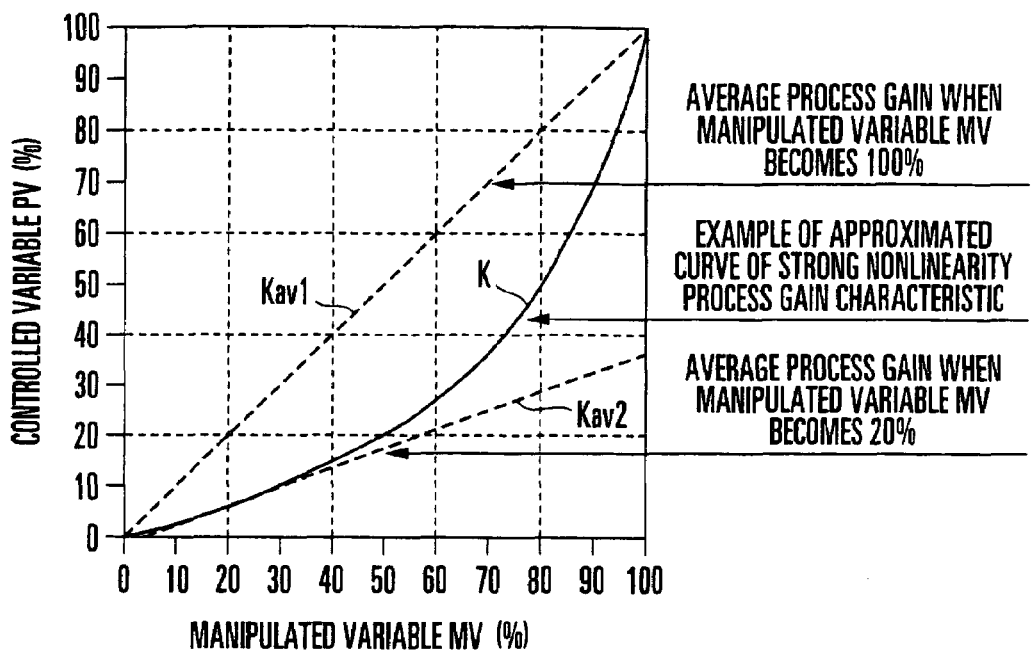
FIG. 14 is a graph showing an example of the process gain characteristic of a strong nonlinearity system.
Figure 15:
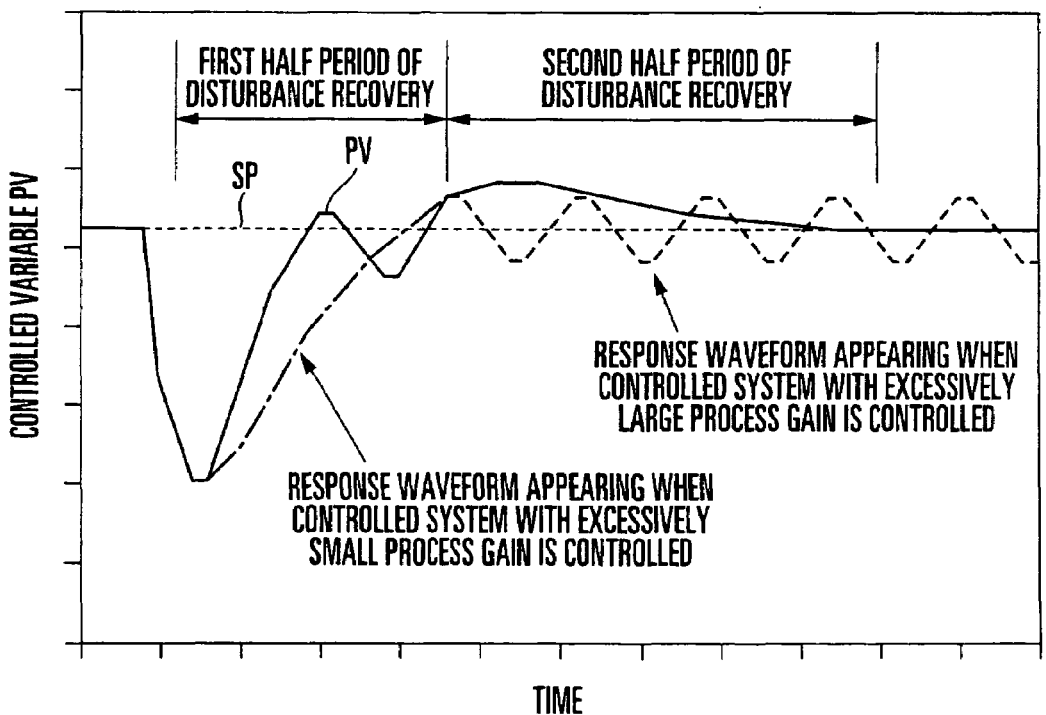
FIG. 15 is a chart showing an example of the disturbance recovery response of a strong nonlinearity system by PID control.
Figure 16A:
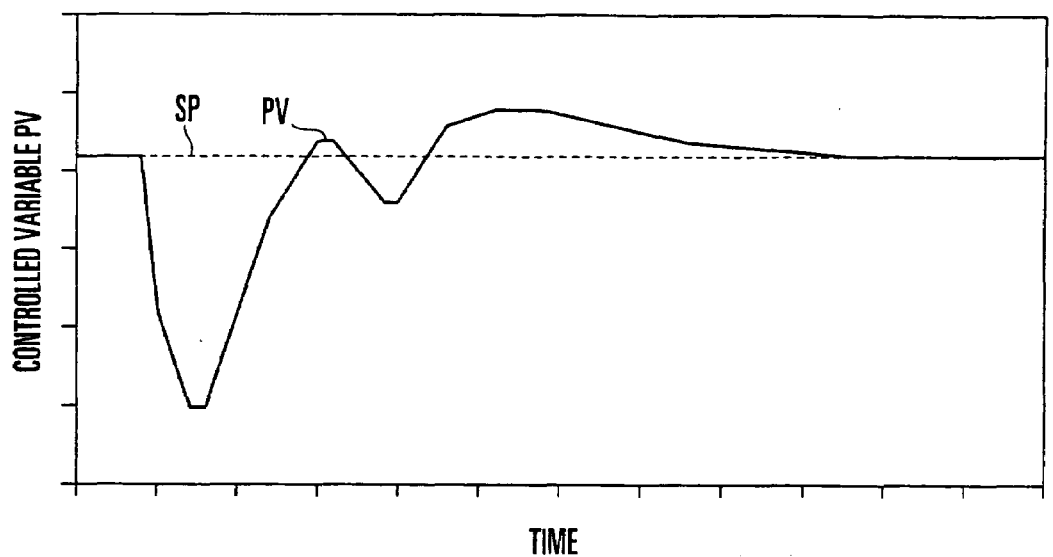
FIGS. 16A and 16B are waveform charts for explaining problems in an advanced adaptive control theory such as simple adaptive control (SAC).
Figure 16B:
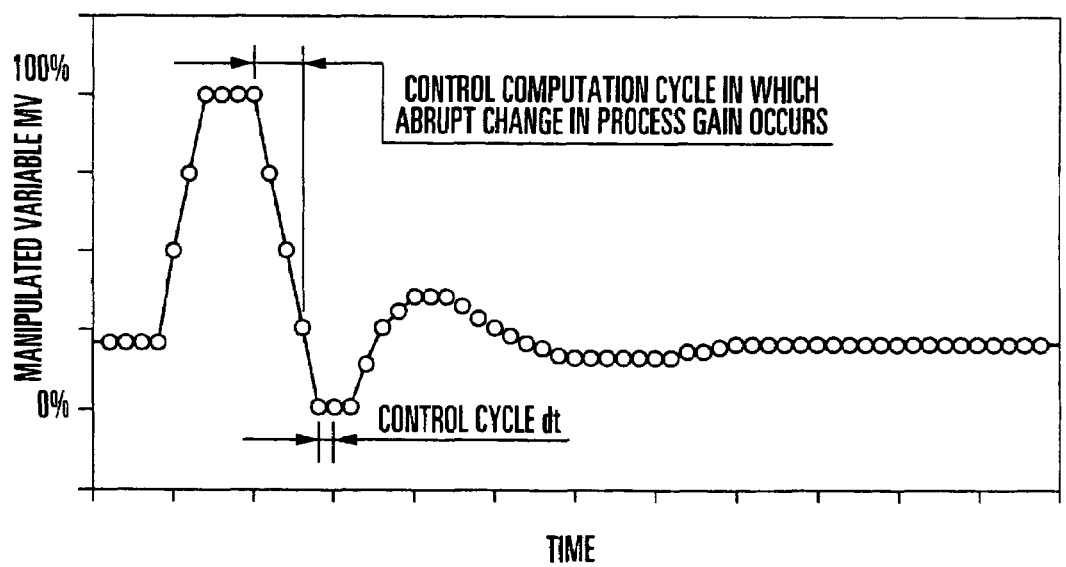

The third embodiment of the present invention will be described next. This embodiment shows another example in which the present invention is applied to fast disturbance recovery control. In this embodiment, the arrangement of a feedback control device and the flow of processing are the same as those shown in FIGS. 2 and 3, and hence will be described by using reference numerals in FIGS. 2 and 3. FIGS. 13A and 13B are waveform charts showing the operation of a feedback control device according to this embodiment. FIG. 13A is a chart showing changes in controlled variable PV. FIG. 13B is a chart showing changes in manipulated variable MV. The symbol "○" in FIG. 13B indicates the manipulated variable MV output in each control cycle dt.

In this embodiment, assume that a switching time point (disturbance application detection time point) t1 from a stable phase to a follow-up phase is a time point at which a phase switching signal is input from an external device which notifies the application of a disturbance. In the field of process control, the application of a disturbance can sometimes be detected before the controlled variable PV actually changes. Before a change in controlled variable PV appears, therefore, a phase switching signal can also be input in a feedforward manner.

Assume that a switching time point (specific disturbance recovery control elapsed time point) t2 from a follow-up phase to a convergence phase is a time point at which a predicted value Tr=Er/ΔPV of the remaining time for attainment calculated on the basis of a deviation Er between a set point SP and the controlled variable PV and a change ratio ΔPV of the controlled variable PV becomes smaller than a preset time index Tx. Assume further that a switching time point (a time point at which a pre-designated state is reached) t3 from a convergence phase to a stable phase is a time point at which a preset time index Tc has elapsed.

In this embodiment, the step of determining the manipulated variable MV in a follow-up phase is the step of continuously outputting a manipulated variable MVc calculated by a PID control (including P, PD, and PI control) algorithm that attaches importance to quick control response. Assume also that the step of determining the manipulated variable MV in a convergence phase is the step of continuously outputting a preset manipulated variable MV2, and the step of determining the manipulated variable MV in a stable phase is the step of continuously outputting a manipulated variable MVd calculated by a PID control algorithm that attaches importance to the stability of control.

When a phase switching signal Sf is externally input in step 101 or 105 in FIG. 3, a first phase switching unit 3 determines that the current time point is the start time point t1 of a follow-up phase, sets the value of a parameter F indicating a phase to F=1 (follow-up phase), and outputs F=1 to a second phase switching unit 4, third phase switching unit 5, and first manipulated variable determining unit 6. That is, the first phase switching unit 3 performs the following processing.

$$\text{if } Sf \text{ is input then } F \leftarrow 1 \quad (13)$$

If the value of the parameter F output from the first phase switching unit 3 is F=1, the first manipulated variable determining unit 6 outputs a manipulated variable MVc(n) calculated by a PID control algorithm that attaches importance to quick control response as manipulated variable MV(n) (step 102 in FIG. 3; FIG. 13B). That is, the first manipulated variable determining unit 6 performs the following processing.

$$\text{if } F=1 \text{ then } MV(n) \leftarrow MVc(n) \quad (14)$$

In this case, the PID control algorithm that attaches importance to the stability of control is expressed by a transfer function using Laplace operators as follows:

$$MVc(n)=Kg1\{1+(1/Ti1s)+Td1s\}\{SP(n)-PV(n)\} \quad (15)$$

In equation (15), Kg1 is a proportional gain, Ti1 is an integral time, and Td1 is a derivative time. Note that the manner of setting the parameters Kg1, Ti1, and Td1 for the attachment of importance to quick response is known, and hence a description thereof will be omitted.

The operation of the second phase switching unit 4 is the same as that in the second embodiment. The operations of a second manipulated variable determining unit 7, the third phase switching unit 5, and a third manipulated variable determining unit 8 are the same as those in the first embodiment.

Obviously, the present invention is not limited to each embodiment described above, and each embodiment can be changed as needed within the technical category of the invention. For example, as described above in the first embodiment, there are two methods of determining whether or not to switch from a stable phase to a convergence phase, there are two methods of determining whether or not to switch from a follow-up phase to a convergence phase, there is one method of determining whether or not to switch from a convergence phase to a stable phase, there are three steps of determining a manipulated variable for a follow-up phase, there is one step of determining a manipulated variable for a convergence phase, and there is one step of determining a manipulated variable for a stable phase. Therefore, the maximum number of combinations of the respective determination methods and the respective manipulated variable determination steps is 2×2×1×3×1×1, i.e., 12, and any one of the combinations can be used.

According to the third sequence (the third embodiment) of the manipulated variable determination steps in a follow-up phase, the first manipulated variable determining unit 6 continuously outputs the manipulated variable MVc calculated by the PID control algorithm that attaches importance to quick response control. However, the present invention is not limited to this. For example, control with importance being attached to quick response by using another control algorithm such as IMC (Internal Model Control) may be performed.

Likewise, in a stable phase, the third manipulated variable determining unit 8 continuously outputs the manipulated variable MVd calculated by the PID control algorithm with importance being attached to the stability of control. However, the present invention is not limited to this, and control with importance being attached to stability may be performed by using another control algorithm.

INDUSTRIAL APPLICABILITY

As has been described above, the feedback control method and feedback control device according to the present invention are suitable for process control, and more particularly, for process control aimed at a system with strong nonlinearity as a controlled system.

The invention claimed is:

1. A feedback control method of performing disturbance recovery control by giving a manipulated variable to a controlled system so as to make a controlled variable recover to a set point at the time of application of a disturbance, comprising:
dividing a response process of disturbance recovery control into three stages including a follow-up phase, a convergence phase, and a stable phase;
a first phase switching step of switching to the follow-up phase at a disturbance application detection time point as a start time point of the follow-up phase;
the follow-up phase manipulated variable determination step of continuously outputting a manipulated variable which makes the controlled variable follow up the set point in the follow-up phase;
the second phase switching step of switching to the convergence phase at a disturbance recovery control elapsed time point, as a start time point of the convergence phase, at which the controlled variable does not exceed the set point in the follow-up phase;
the convergence phase manipulated variable determination step of continuously outputting a manipulated variable which makes the controlled variable converge near the set point in the convergence phase so as to prevent a control response waveform from being disturbed before and after a switching time point between the follow-up phase and the stable phase;
the third phase switching step of switching to the stable phase at a time point, as a start time point of the stable phase, at which a preset state is reached in the convergence phase; and
the stable phase manipulated variable determination step of continuously outputting a manipulated variable which makes the controlled variable stable at the set point in the stable phase.

2. A feedback control method according to claim 1, characterized in that the first phase switching step comprises the step of setting a time point, as the start time point of the follow-up phase, at which it is confirmed on the basis of a deviation between a set point and a controlled variable that a disturbance has been applied.

3. A feedback control method according to claim 1, characterized in that the first phase switching step comprises the step of setting a time point, as the start time point of the follow-up phase, at which a phase switching signal is input from an external unit which notifies application of a disturbance.

4. A feedback control method according to claim 1, characterized in that the second phase switching step comprises the step of calculating a predicted value of a remaining time for attainment which is a time taken for a current controlled variable to reach the set point in the follow-up phase, on the basis of a deviation between the set point and the controlled variable and a controlled variable change ratio, and the step of setting a time point, as the start time point of the convergence phase, at which the calculated predicted value of the remaining time for attainment becomes smaller than a preset time index.

5. A feedback control method according to claim 1, characterized in that the third phase switching step comprises the step of setting a time point, as the start time point of the stable phase, at which a preset time index has elapsed.

6. A feedback control method according to claim 1, characterized in that the follow-up phase manipulated variable determination step comprises the step of continuously outputting a preset manipulated variable.

7. A feedback control method according to claim 1, characterized in that the convergence phase manipulated variable determination step comprises the step of continuously outputting a preset manipulated variable.

8. A feedback control device for dividing a response process of disturbance recovery control into three stages including a follow-up phase, a convergence phase, and a stable phase and performing disturbance recovery control by giving a manipulated variable to a controlled system so as to make a controlled variable recover to a set point at the time of application of a disturbance, comprising:
a first phase switching unit which switches to the follow-up phase at a disturbance application detection time point as a start time point of the follow-up phase;
a second phase switching unit which switches to the convergence phase at a disturbance recovery control elapsed time point, as a start time point of the convergence phase, at which the controlled variable does not exceed the set point in the follow-up phase;
a third phase switching unit which switches to the stable phase at a time point, as a start time point of the stable phase, at which a preset state is reached in the convergence phase;
a first manipulated variable determining unit which continuously outputs a manipulated variable which makes the controlled variable follow up the set point in the follow-up phase;
a second manipulated variable determining unit which continuously outputs a manipulated variable which makes the controlled variable converge near the set point in the convergence phase so as to prevent a control response waveform from being disturbed before and after a switching time point between the follow-up phase and the stable phase; and
a third manipulated variable determining unit continuously outputs a manipulated variable which makes the controlled variable stable at the set point in the stable phase.

9. A feedback control device according to claim 8, characterized in that said first phase switching unit sets a time point, as the start time point of the follow-up phase, at which it is confirmed on the basis of a deviation between a set point and a controlled variable that a disturbance has been applied.

10. A feedback control device according to claim 8, characterized in that said first phase switching unit sets a time point, as the start time point of the follow-up phase, at which a phase switching signal is input from an external unit which notifies application of a disturbance.

11. A feedback control device according to claim 8, characterized in that said second phase switching unit calculates a predicted value of a remaining time for attainment which is a time taken for a current controlled variable to reach the set point in the follow-up phase, on the basis of a deviation between the set point and the controlled variable and a controlled variable change ratio, and sets a time point, as the start time point of the convergence phase, at which the calculated predicted value of the remaining time for attainment becomes smaller than a preset time index.

12. A feedback control device according to claim 8, characterized in that said third phase switching unit sets a time point, as the start time point of the stable phase, at which a preset time index has elapsed.

13. A feedback control device according to claim 8, characterized in that said manipulated variable determining unit continuously outputs a preset manipulated variable.

14. A feedback control device according to claim 8, characterized in that said second manipulated variable determining unit continuously outputs a preset manipulated variable.

* * * * *